Figure 1:
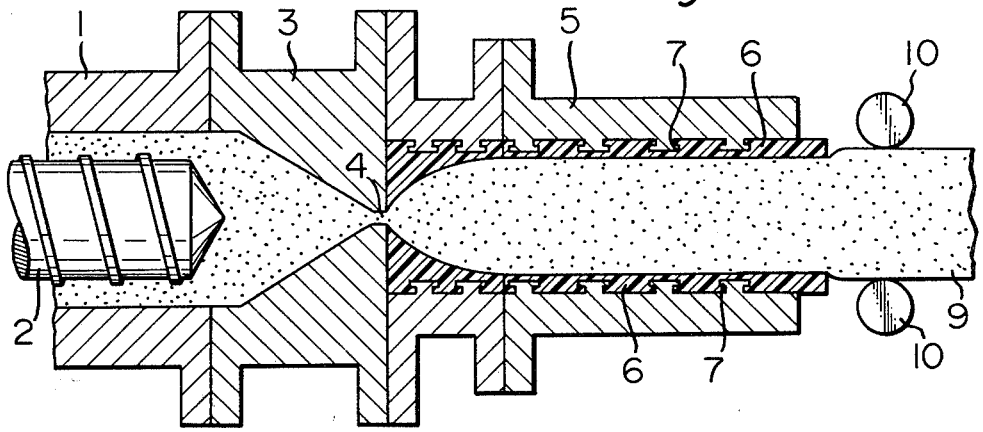

United States Patent [19]

Hatakeyama et al.

[11] 4,324,748

[45] Apr. 13, 1982

[54] PROCESS AND APPARATUS FOR EXTRUDING PLASTIC FOAMS THROUGH A FLUOROCARBON LINED DIE SHAPING MEANS HAVING EXTENDED WEAR CHARACTERISTICS

[75] Inventors: Hideo Hatakeyama, Hiratsuka; Toru Yamamoto, Kanuma, both of Japan

[73] Assignee: Japan Styrene Paper Corporation, Tokyo, Japan

[21] Appl. No.: 189,944

[22] Filed: Sep. 22, 1980

Related U.S. Application Data

[63] Continuation-in-part of Ser. No. 60,664, Jul. 25, 1979, abandoned.

[30] Foreign Application Priority Data

Jul. 28, 1978 [JP] Japan ................................. 53-92183

[51] Int. Cl.$^3$ ......................... B29D 27/00; B29C 1/04
[52] U.S. Cl. ....................................... 264/51; 264/53; 264/338; 425/461; 425/DIG. 55; 425/DIG. 115
[58] Field of Search ................... 264/51, 53, 338, 127; 425/90, 325, 467, DIG. 55, 107, DIG. 115, 461; 249/112, 115, 114

[56] References Cited

U.S. PATENT DOCUMENTS

| | | | |
|---|---|---|---|
| 519,801 | 5/1894 | Wallace | 249/112 |
| 1,240,019 | 9/1917 | Board | 249/112 X |
| 2,403,476 | 7/1946 | Berry et al. | 264/176 R X |
| 2,740,157 | 4/1956 | McCurdy et al. | 264/53 |
| 2,747,222 | 5/1956 | Koch et al. | 264/176 R |
| 3,033,008 | 5/1962 | Davis | 249/115 |
| 3,111,714 | 11/1963 | Branscom | 425/107 |
| 3,127,457 | 3/1964 | Di Pinto | 264/338 X |
| 3,446,884 | 5/1969 | Miller et al. | 264/338 X |
| 3,874,981 | 4/1975 | Hayashi et al. | 264/46.1 X |
| 3,897,528 | 7/1975 | Suh | 264/53 X |
| 3,920,876 | 11/1975 | Albert et al. | 264/46.1 X |
| 3,954,929 | 5/1976 | Hoenke | 264/46.1 X |
| 4,017,576 | 4/1977 | Freed et al. | 264/127 X |

FOREIGN PATENT DOCUMENTS

| | | | |
|---|---|---|---|
| 451864 | 10/1948 | Canada | 264/53 |
| 1586203 | 2/1970 | France | 425/DIG. 55 |

*Primary Examiner*—Philip Anderson
*Attorney, Agent, or Firm*—Wenderoth, Lind & Ponack

[57] ABSTRACT

In a method for producing a plastic foam of a desired expanded dimension which is constituted by extruding a melt of a thermoplastic synthetic resin containing a blowing agent through a die of an extruder and passing the extrudate through a shaping device located outwardly of the extruder and secured to the discharge end of the extruder while expanding and solidifying the molten mass so that it fills the shaping device; the improvement wherein at least a part of that area of the inside surface of the shaping device with which the expanded resin makes contact is formed of a plate of a fluorocarbon resin, said plate being secured to the inside surface of the shaping device by fitting portions, said fitting portions having a sufficient space for absorbing an increase in the volume of the fluorocarbon resin plate at the temperature of extrusion molding; and an apparatus for use in the above described process.

11 Claims, 5 Drawing Figures

PROCESS AND APPARATUS FOR EXTRUDING PLASTIC FOAMS THROUGH A FLUOROCARBON LINED DIE SHAPING MEANS HAVING EXTENDED WEAR CHARACTERISTICS

This application is a continuation-in-part application of Ser. No. 60,664 filed on July 25, 1979, now abandoned.

This invention relates to a method and an apparatus for producing thermoplastic synthetic resin foams, especially thick foams, by an extrusion-molding technique.

A thick foam of a thermoplastic synthetic resin is produced by an extrusion molding technique generally by injecting a volatile blowing agent into a melt of a thermoplastic synthetic resin in an extruder, heating and mixing them, extruding the molten mixture through a die, and passing the extrudate through a shaping device secured to the end of the die exit to cool and shape it. The molten resin containing the blowing agent is continuously extruded through the die exit, and fills the shaping device while expanding. The extrudate advances toward the exit of the shaping device while making contact with the internal wall of the shaping device so that the thickness of the plastic foam is restricted by the height of the space of the device, and after leaving the shaping device, the foam is taken up (see, for example, U.S. Pat. No. 3,954,929).

Such a shaping device is usually made of a metal such as iron. However, since the frictional resistance of the metal to the molten mixture is high, a plastic foam having a good surface cannot be obtained. To solve this problem, it has been the previous practice to coat the inside surface of the metallic body of the shaping device with a fluorocarbon resin. For a short limited period, such a shaping device can produce plastic foams with a good surface condition, but because the fluorocarbon resin coating is rapidly consumed by friction, the shaping device must be coated again after a short period of time.

It is an object of this invention therefore to provide an extrusion molding apparatus provided with a shaping device the inside surface of which has low frictional resistance to an expanded resin and which can be used for an extended period of time.

The object of this invention is achieved in a method for producing a plastic foam of a desired expanded dimension which comprises extruding a melt of a thermoplastic synthetic resin containing a blowing agent through a die of an extruder and passing the extrudate through a shaping device located outwardly of the extruder and secured to the discharge end of the extruder while expanding and solidifying the molten mass so that it fills the shaping device, by the improvement wherein at least a part of that area of the inside surface of the shaping device with which the expanded resin makes contact is formed of a plate of a fluorocarbon resin, said plate being secured to the inside surface of the shaping device by fitting portions, said fitting portions having sufficient space for absorbing an increase in the volume of the fluorocarbon resin plate at the temperature of extrusion molding.

It is important that in the shaping device fitted to the discharge end of the extruder of the apparatus of this invention, that surface which makes contact with the expanded resin is formed of a thick plate of a fluorocarbon resin, and that the fitting portions connected to the metallic body of the shaping device have sufficient room or space for absorbing an increase in the volume of the resin plate at the temperature of extrusion molding.

When a thick fluorocarbon resin sheet is simply bonded to the inside surface of the shaping device, warpage occurs in the resin sheet due to the difference in thermal expansion between the metal and the resin sheet at the temperature of extrusion, and plastic foams of good quality cannot be obtained. Moreover, the resin sheet and the metal are frequently delaminated, and the shaping device becomes useless.

Since the inside surface of the shaping device in the apparatus of this invention is made of a fluorocarbon resin plate, it has low frictional resistance, and therefore can give a foam having a smooth and beautiful surface. The shaping device can withstand use for a much longer period of time than similar devices having a surface coating of fluorocarbon. Moreover, because the fluorocarbon resin plate forming the inside surface of the shaping device is not merely bonded to the metallic body of the device, the shaping device in accordance with this invention can be continuously operated stably without causing delamination or warpage due to differences in thermal expansion during extrusion.

The conventional shaping device must be externally cooled or heated for temperature adjustment in order to obtain good foams. In contrast, the shaping device in accordance with this invention requires no such external temperature control. The fluorocarbon resin plate in the shaping device in this invention can be easily mounted and detached as desired.

The shaping device in accordance with this invention is described specifically below with reference to the accompanying drawings showing one embodiment of the apparatus of this invention in which the top and bottom portions of the shaping device are made of metal and its sides are made of a fluorocarbon resin, and a fluorocarbon resin plate is secured to the inside surfaces of the top and bottom portions.

Figure 2:
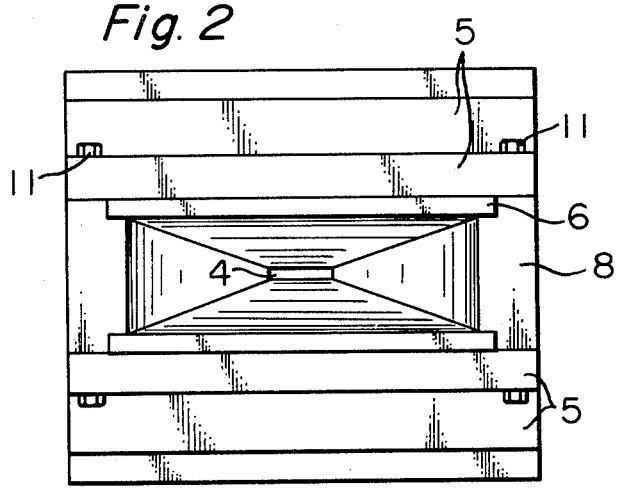
Figure 3:
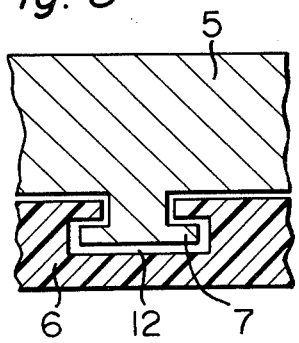
Figure 4:
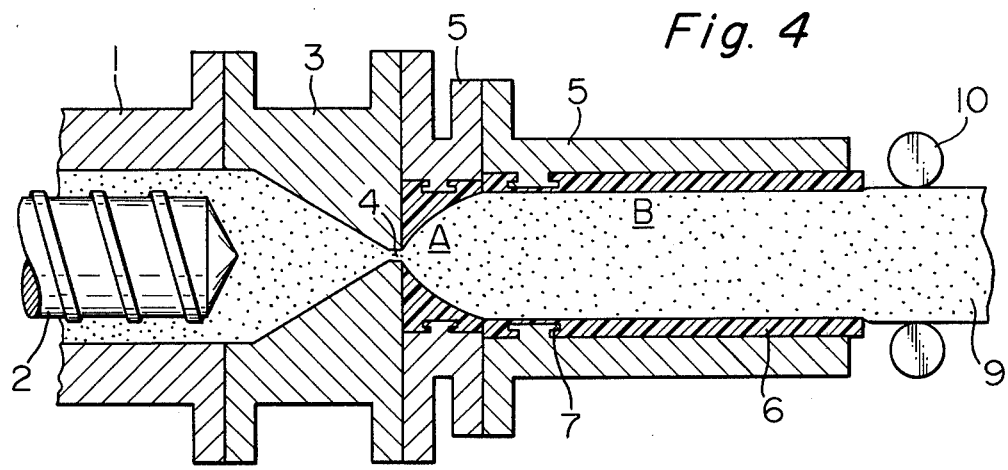
Figure 5:
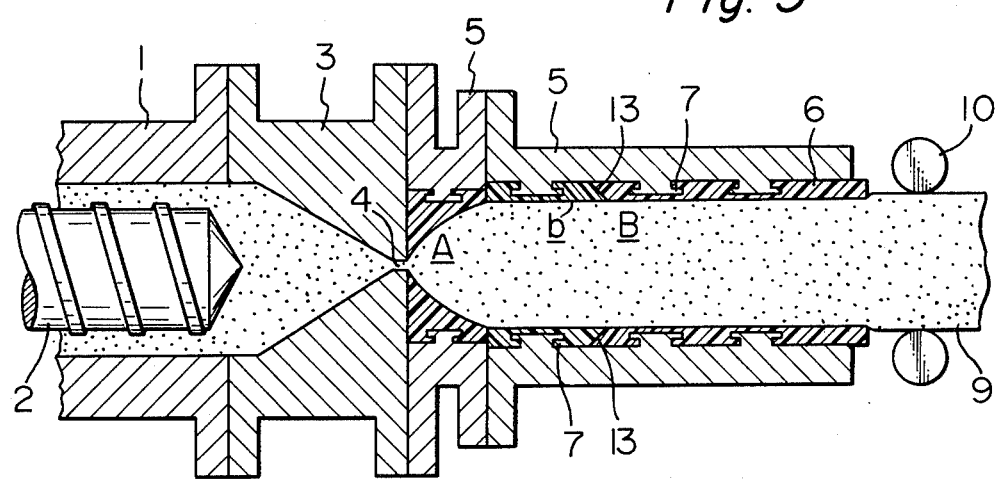

FIG. 1 is a sectional view showing the shaping device secured to the die exit of an extruder; FIG. 2 is a front elevation thereof; FIG. 3 is an enlarged partial sectional view showing how a fluorocarbon resin plate is secured to the extruder; FIGS. 4 and 5 show modifications of the shaping device shown in FIG. 1.

In the drawings, the reference numerals designate the members as follows: 1, the body of an extruder; 2, a screw; 3, a die; 4, a lip; 5, metal constituting the body of a shaping device; 6, a fluorocarbon resin plate constituting the top and bottom inside surfaces of the shaping device; 7, protrusions; 8, a fluorocarbon resin plate constituting the inner side surfaces of the shaping device; 9, a foam of a thermoplastic synthetic resin; 10, a pair of take-up rolls; 11, clamping bolts; and 12, depressions.

Referring to FIGS. 4 and 5 showing other embodiments of the fluorocarbon resin plate in the shaping device in accordance with this invention, the shaping device consists of a foaming chamber A and a shape-arranging chamber B. The number of fitting portions which receive the fluorocarbon resin plate provided on the inside surface of the shape-arranging chamber B may be one, and need not to be plural as in FIG. 1. When the fitting portion for the fluorocarbon resin plate is formed at one place (one both at the top and bottom parts), such fitting portions are provided in the shape-arranging chamber of the shaping device at positions near the foaming chamber, as shown, for example, in FIG. 4.

When the shaping device in accordance with this invention is operated continuously for a long period of time, that portion of the resin plate which is in the foaming chamber and in the shape-arranging chamber at a position near the foaming chamber (the portion shown by b in FIG. 5) may sometimes undergo wear, leading to the difficulty of providing a good foam. In such a case, the worn part must be repaired or removed, but it is economically disadvantageous to replace all of the resin plate. To avoid this disadvantage, in the embodiment shown in FIG. 5, the resin plate provided in the shape-arranging chamber is divided into two or more portions joined a bonding portion 13, so that in the event of repair, only the portion b of the resin plate in the shape-arranging chamber need be replaced.

To secure the fluorocarbon resin plate 6 to the inside surface of the shaping device, it is necessary to provide a space between the fitting portions 7 for connecting the resin plate to the metallic body and the inside surface of the depressions 12 in the resin plates, the space being sufficient for absorbing the increase in the volume of the resin plate at the temperature of extrusion molding. Securing of the fluorocarbon resin plate may, for example, be effected by providing projections or protrusions 7 on the inside surface of the metallic body 5 and recesses or depressions 12 on the resin plate, and fitting the protrusions 7 into the depressions 12. Alternatively, depressions can be provided on the inside surface of the metallic body and protrusions on the resin plate, and the protrusions are fitted into the depression. Or there may also be used a method which comprises providing groove-like depressions both on the inside surface of the metallic body and the resin plate, bringing the grooved portions of the two elements face-to-face, and inserting stops into the groove-like depressions. The protrusions on the inside surface of the metallic body or the fluorocarbon resin plate may be provided continuously or discontinuously in various configurations. Usually, each protrusion has the shape of a railroad rail disposed at right angles to the extruding direction of the foam in the shaping device. Other shapes, such as a mushroom-like shape or hook-like shape, are also possible. The corresponding depressions are usually groove-like, but may be of other shapes conforming to the shapes of the protrusions.

In securing the fluorocarbon resin plate to the metallic body of the shaping device in this invention in the various modes exemplified hereinabove, it is necessary to provide between the fitting portion and the inside surface of the depressions sufficient room or space for absorbing an increase in the volume of the resin plate at the temperature of extrusion. This is important for preventing delamination or warpage of the resin plate owing to thermal expansion at the time of producing a plastic foam. The space may be equal to, or greater than, the increase of the volume of the resin plate which may be caused by thermal expansion at the temperature of extrusion molding. The space is filled by the thermal expansion of the resin plate at the time of extrusion molding, or partly filled so as to leave only a small space, and in this state, the resin plate is united integrally with the metallic body. Since the thermal expansion of the metal at the temperature of extrusion molding is much lower than that of the resin plate, the expansion of the metal body can be ignored in actually determining the magnitude of the space around the fitting portion.

Preferably, the magnitude of the space for absorbing an increase in the volume of the resin plate at the temperature of extrusion molding becomes gradually larger the nearer its location to the discharge end of the shaping device.

In the shaping device in this invention, the fluorocarbon resin plate can be designed such that it extends beyond the end portion of the metallic body at the discharge end of the shaping device and its forward end is located close to a pair of take-up rolls 10, as shown in FIG. 1. This construction permits production of a plastic foam having a smooth and beautiful surface and retaining the desired thickness restricted within the shaping device.

The fluorocarbon resin plates may also be secured to the inner side surfaces of the shaping device by the provision of grooves or protrusions in the metallic body as in the top and bottom surfaces of the shaping device. Or it is possible to form the top and bottom portions of the shaping device using metal plates and fluorocarbon resin plates secured thereto, and to form its side portions of fluorocarbon resin plates alone and which are secured to the top and bottom portions by means of bolts, etc.

The magnitude of the aforesaid space around the fitting portion is specifically explained below with reference to an example of the shaping device used in this invention which is composed of a metallic body of iron and a plate of polytetrafluoroethylene secured thereto by the provision of rail-like continuous projections in the metallic body and groove-like depressions having the corresponding shape in the polytetrafluoroethylene plate. For example, in the production of a foam at an extrusion-molding temperature of 110° C. using a polytetrafluoroethylene plate having a thickness of 20 mm, a width of 350 mm and a length of 450 mm in the shaping device, the polytetrafluoroethylene plate is secured to the inside surface of the shaping device by providing five spaces between the projections formed on the metallic body and the depressions provided in the resin plate, each space having a magnitude of about 0.2 mm in the thickness direction, about 1.6 mm (a total of 3.2 mm) in the widthwise direction on each side of the projection, and about 0.4 mm (a total of 0.8 mm) in the lengthwise direction on each side of the projection. These spaces substantially disappear during the expansion of the resin plate at the time of extrusion molding, and cause no trouble during the forming operation. The extrusion molding operation can be performed continuously over long periods of time, and plastic foams of good quality can be obtained without any damage to the shaping device even when the operation is performed continuously for three months.

Suitable fluorocarbon resin plates for use in this invention are, for example, a plate of poly(tetrafluoroethylene), a plate of a tetrafluoroethylene/hexafluoropropylene copolymer and a plate of a tetrafluoroethylene/perfluoroalkylvinyl ether copolymer. The thickness of the resin plate is 5 mm to 50 mm, preferably 10 mm to 40 mm.

The metal which constitutes the outside wall of the shaping device of this invention includes, for example, iron, brass, stainless steel, and aluminum alloys.

Examples of the thermoplastic synthetic resin that can be extended by the use of this invention are styrene resins such as polystyrene and copolymers of a major proportion of styrene and a minor proportion of another monomer, olefinic resins such as polyethylene, polypropylene and an ethylene/vinyl acetate copolymer, and mixtures of these. The volatile blowing agent may be known blowing agents including hydrocarbons such as propane, butane and pentane, and halogenated hydrocarbons such as chloromethane, dichlorodifluoromethane, and trichlorofluoromethane.

What we claim is:

1. In a method for producing plastic foam by extruding a melt of a thermoplastic synthetic resin containing a blowing agent through an extrusion die on the end of an extruder, and forming and solidifying it by passing it through a shaping device having a metallic body secured to the discharge end of the extruder and extending away from said die in the direction of extrusion on the extruder opening into the inlet of the shaping device, the improvement comprising providing a plate of a fluorocarbon resin on at least a part of the inside surfaces of the metallic body, one of said body and said plate having recesses therein and the other of said body and said plate having projections thereon interfitted with said recesses, the inner surfaces of said recesses and the exterior surfaces of said projections being spaced from each other when the plate is unheated, said spaces being sufficiently large to just accommodate the resin plate at the temperature of extrusion from the heat of the resin for causing said projections to fit in said recesses for holding said plate securely on said shaping device.

2. An apparatus for producing a plastic foam by extruding a melt of a thermoplastic synthetic resin containing a blowing agent and foaming and solidifying it, said apparatus comprising an extruder having a discharge end with an extrusion die thereat, a shaping device secured to the discharge end of the extruder and extending away from said die in the direction of extrusion, said die on the extruder opening into the inlet of the shaping device, said shaping device having a metallic body and a plate of a fluorocarbon resin on at least a part of the inside surfaces of the metallic body, one of said body and said plate having recesses therein and the other of said body and said plate having projections thereon interfitted with said recesses, the inner surfaces of said recesses and the exterior surfaces of said projections being spaced from each other when the plate is unheated, said spaces being sufficiently large to just accommodate the resin plate at the temperature of extrusion molding, whereby when said plate is heated during extrusion said projections fit in said recesses for holding said plate securely on said shaping device.

3. The apparatus as claimed in claim 2 wherein said projections are provided on the inside surfaces of the metallic body, and said recesses are provided on the fluorocarbon resin plate.

4. The apparatus as claimed in claim 2 wherein said recesses are provided on the inside surfaces of the metallic body, and said projections are provided on the fluorocarbon resin plate.

5. The apparatus as claimed in claim 3 or 4 wherein the projections are rail-like projections extending continuously at right angles to the lengthwise direction of the shaping device.

6. The apparatus as claimed in claim 3 or 4 wherein the projections are discontinuous.

7. The apparatus as claimed in claim 3 or 4 wherein the recesses are continuous grooves.

8. The apparatus as claimed in claim 3 or 4 wherein the recesses have a shape suitable for receiving the corresponding projections, and are individually provided at points opposed to the projections.

9. The apparatus as claimed in claim 3 wherein said recesses are grooves and said projections are stops, said other said body and said plate having grooves therein opposed to said firstmentioned grooves and in which said stops are positioned, said stops having the other ends interfitted in said firstmentioned grooves.

10. The apparatus as claimed in claim 3 wherein the spacing between the projections and the recesses when the plate is unheated gradually increases toward the discharge end of the shaping device.

11. The apparatus as claimed in claim 3 wherein the fluorocarbon resin plate extends beyond the discharge end of the shaping device for being located close to a pair of take-up rolls outside the shaping device.

* * * * *